Figure 1:
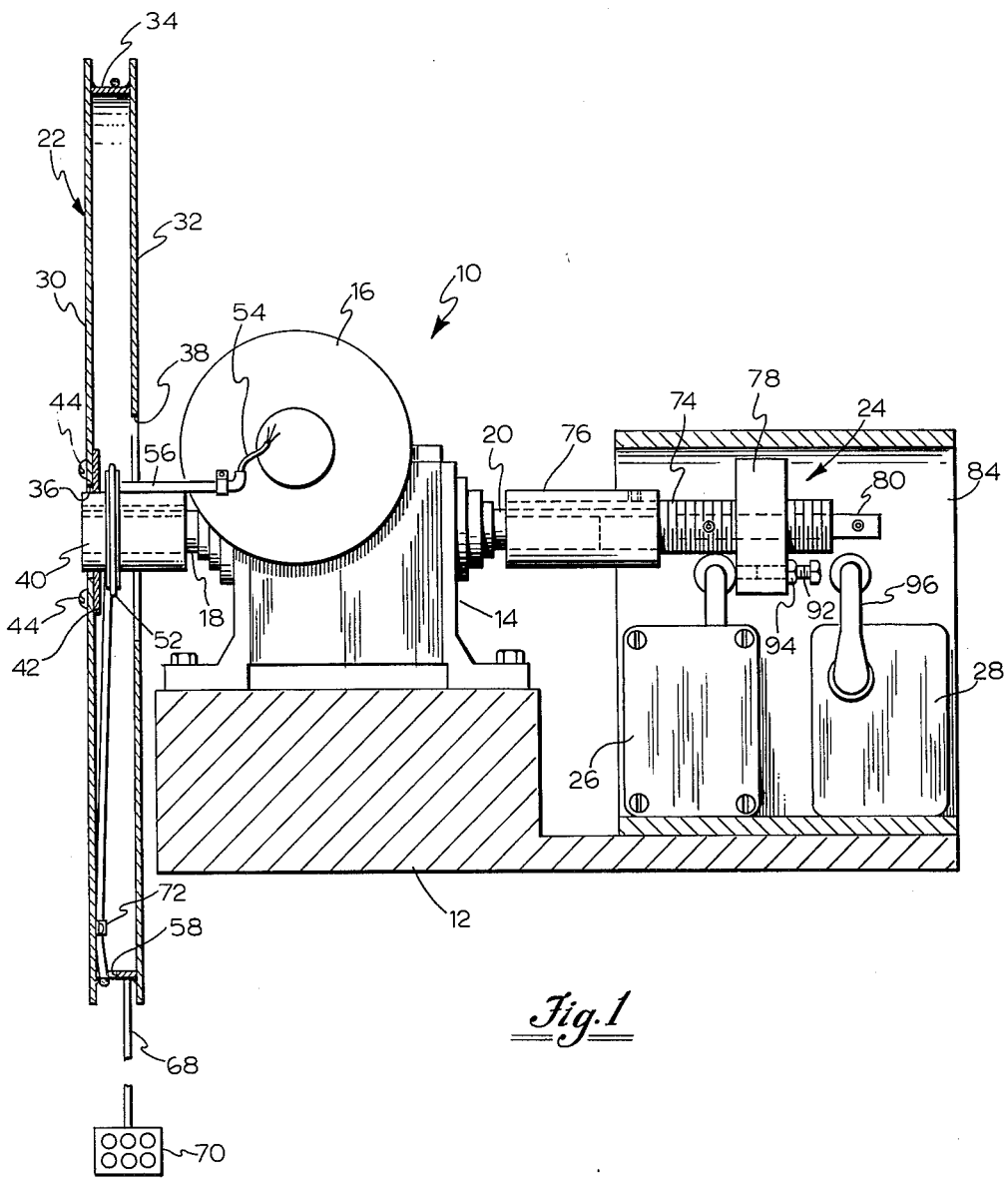

Dec. 7, 1965   W. L. HOLBERG   3,222,002
CONDUIT WINDUP REEL
Filed April 8, 1963   4 Sheets-Sheet 1

Dec. 7, 1965 W. L. HOLBERG 3,222,002
CONDUIT WINDUP REEL

Filed April 8, 1963 4 Sheets-Sheet 4

United States Patent Office 3,222,002
Patented Dec. 7, 1965

3,222,002
CONDUIT WINDUP REEL
William L. Holberg, Glassboro, N.J., assignor to Socony Mobil Oil Company, Inc., a corporation of New York
Filed Apr. 8, 1963, Ser. No. 271,429
8 Claims. (Cl. 242—54)

The present invention relates to windup reels for flexible conduits, and more particularly to a windup reel for an electrical cable that can be wound and unwound with one end of the cable fixed to the reel in a manner to simplify electrical connection thereto.

There are many applications wherein an overhead windup reel is advantageous for storing flexible conduits such as electrical cables, air hoses, or the like, in a retracted position in a manner to enable one end of the conduit to be lowered into position for use by an operator. One example of such an application is a new type of diagnostic center for analyzing the condition of automobile engines. In these centers the automobile is driven into position relative to a battery of special equipment. When the automobile is properly positioned, a starting switch is actuated to automatically bring some of the equipment into action for analyzing the engine of the car. In connection with this operation, an overhead windup reel for an electrical cable must be provided to lower an electric control box into position to be used by an operator to control the actuation of other special equipment for diagnosing the automobile engine. With such a windup reel, the problem is presented as to how to make the necessary electrical connections to the other end of the cable attached to the windup reel. In many prior art windup reels this is done by brushes and slip rings since the other end of the cable is rotated with the windup reel and therefore requires a sliding electrical connection.

In accordance with the present invention, a windup reel construction is provided which enables the end of the flexible conduit associated with the reel to be fixed so that stationary electrical connections may be made thereto in a very simple manner. This is accomplished by providing a windup reel having the conduit wound about an outer annular wall with the end of the cable to which connection is to be made extending through the wall radially inwardly and fixed against rotation so that connections can be made directly to the stationary end of the conduit. The conduit is wound to form a plurality of turns near the fixed inner end which are held separated by a spring and which merely loosen and tighten in response to rotation of the outer wall to extend and retract the conduit. In accordance with another feature of the invention, a control mechanism is provided to automatically stop the rotation of the reel when the control box on the end of the conduit reaches either its fully extended or fully retracted position.

Accordingly it is one object of the invention to provide a windup reel for a flexible conduit which enables one end of the conduit to be raised and lowered while the other end remains stationary.

It is another object of the invention to simplify the connection to one end of a flexible conduit wound about a windup reel in a manner to enable the other end of the conduit to be raised and lowered.

It is a further object of the invention to provide a windup reel as described above having a control mechanism associated therewith for automatically stopping the unwinding of the conduit on the reel at a predetermined position and also automatically stopping the winding of the conduit at another predetermined position.

It is a still further object of the invention to provide a windup reel and automatic control which is simple and rugged in construction, effective and dependable in operation, and economical to manufacture.

Figure 2:
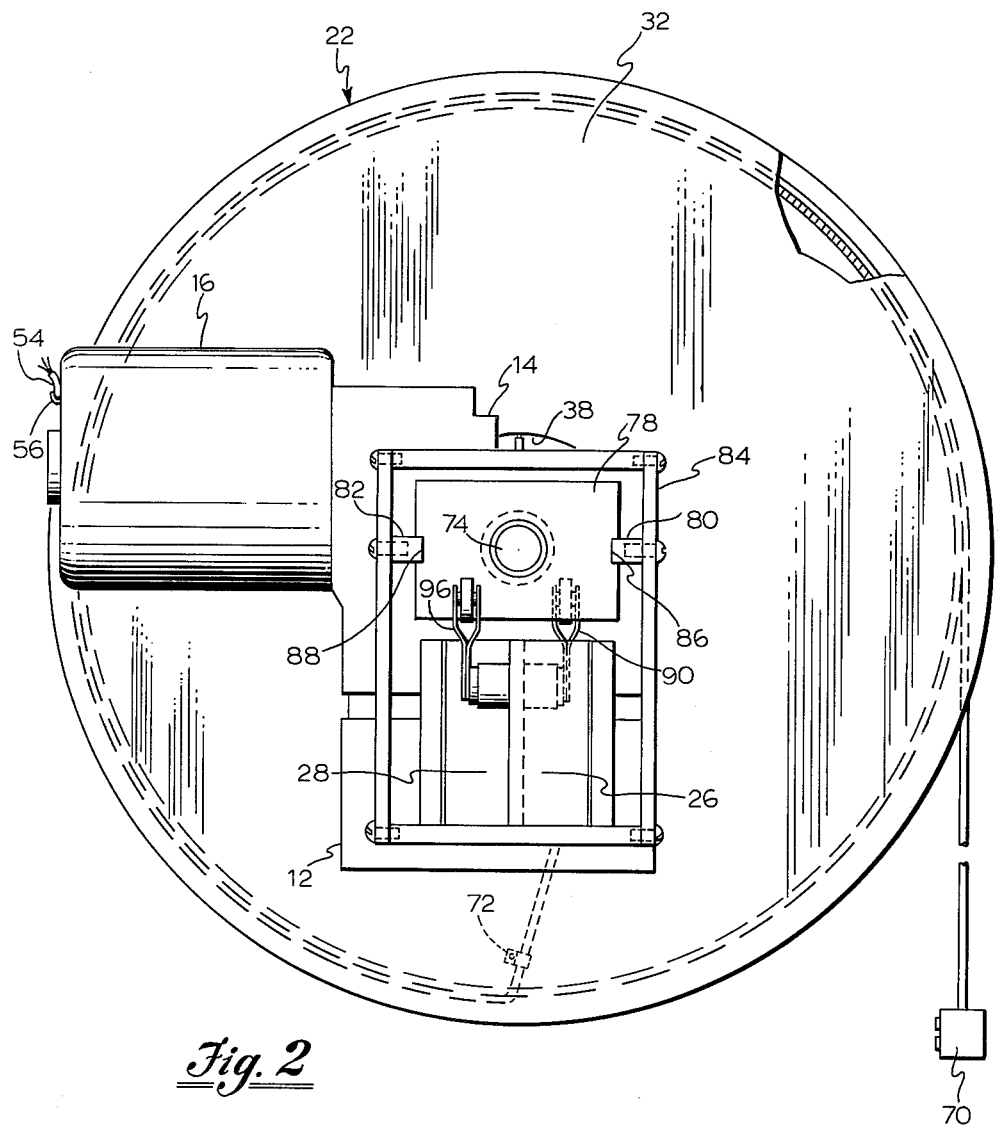
Figure 3:
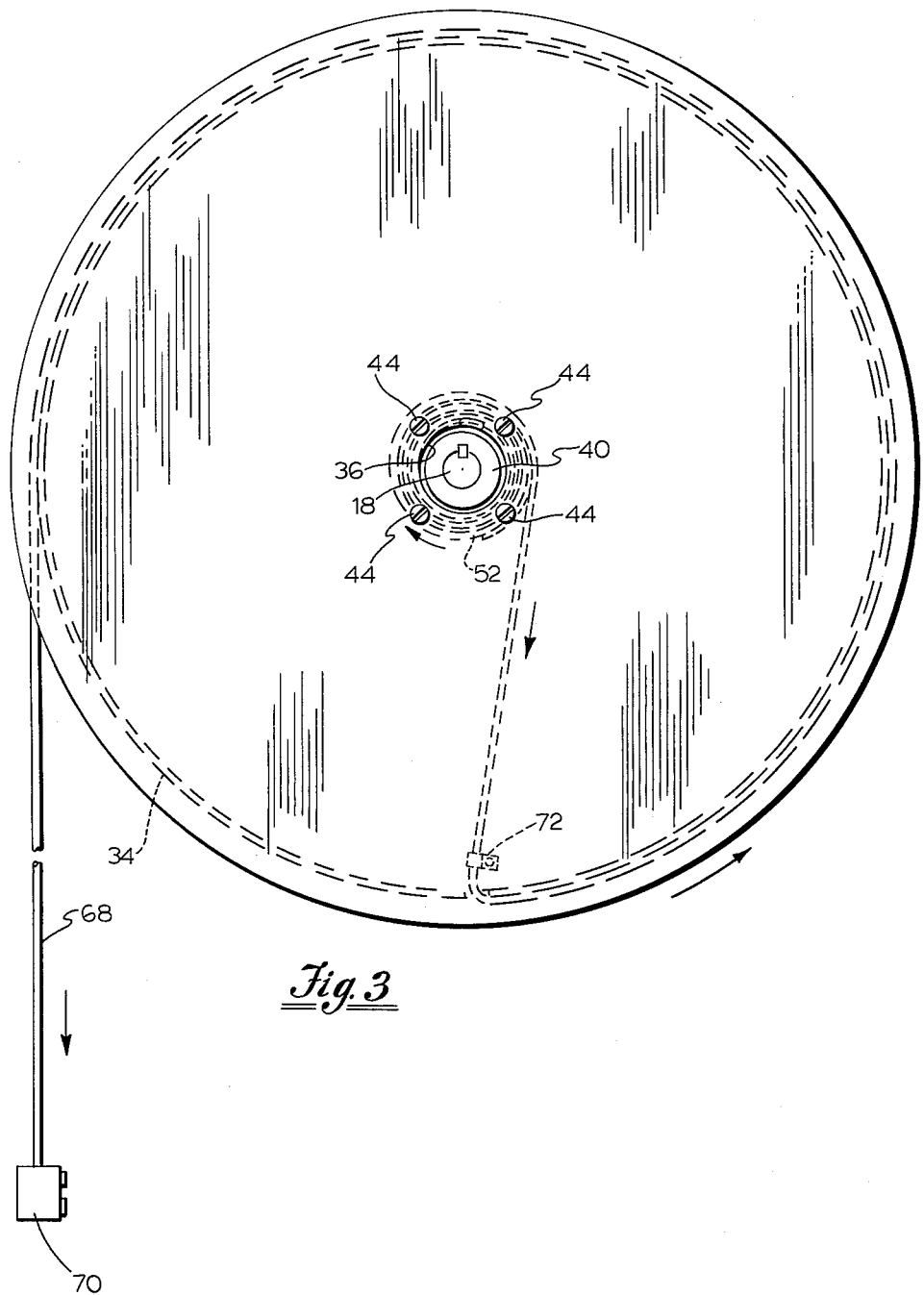
Figure 4:
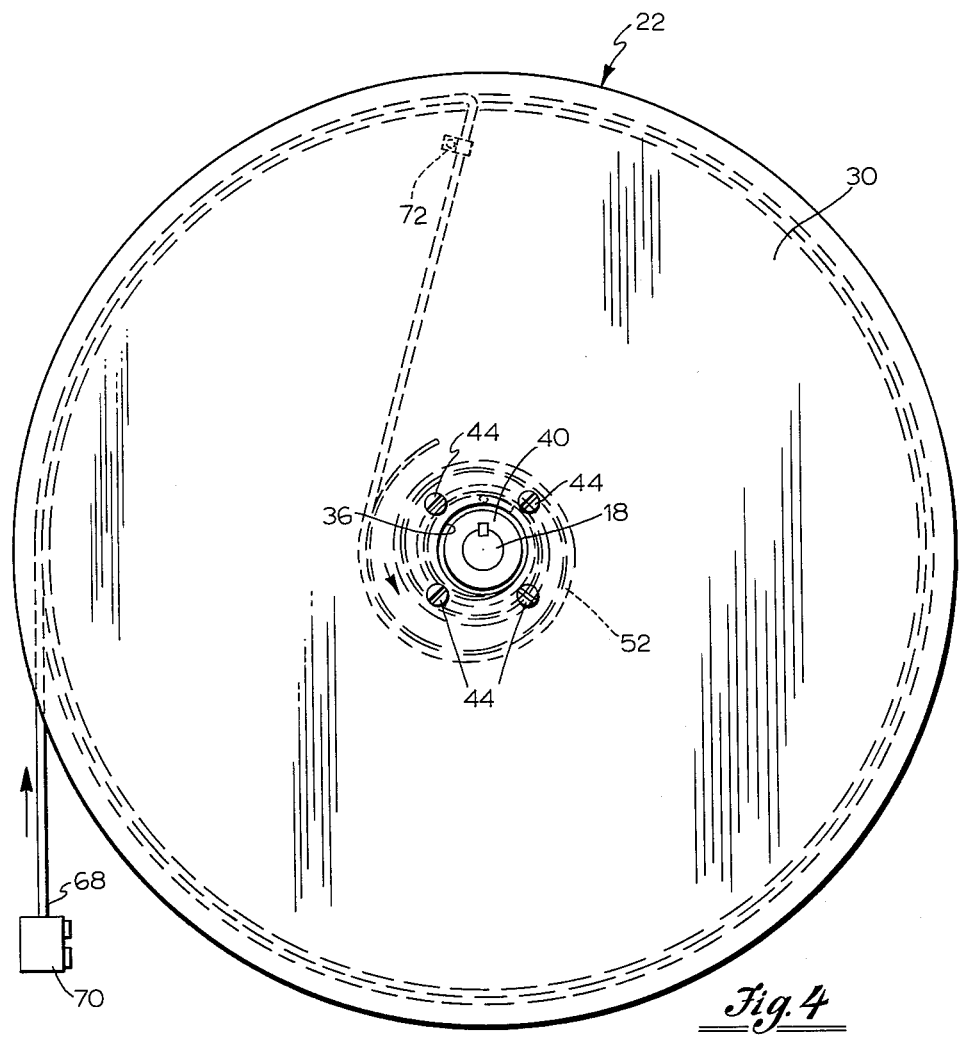

Other objects and features of novelty of the present invention will be specifically pointed out or will otherwise become apparent when referring, for a better understanding of the invention, to the following description taken in conjunction with the accompanying drawings, wherein:

FIG. 1 is a sectional view of a windup reel and control mechanism embodying features of the present invention;
FIG. 2 is an end view of the right end of the structure illustrated in FIG. 1;
FIG. 3 is an end view of the left end of the structure illustrated in FIG. 1; and
FIG. 4 is a view similar to FIG. 3, but showing the conduit fully wound on the reel.

Referring to FIGS. 1–3, a windup reel and control mechanism 10 is illustrated which embodies features of the present invention. It comprises a base 12 having a speed-reducing unit 14 mounted on a central portion thereof in position to be driven by an electric motor 16. The speed-reducing unit 14 has two output shafts 18 and 20 with a windup reel 22 mounted on the output shaft 18 for rotation therewith and a running nut assembly 24 mounted on the output shaft 20 for actuating a pair of limit switches 26 and 28, as will be described.

The windup reel 22 comprises a pair of circular end walls 30 and 32 interconnected by a cylindrical wall 34. The end wall 30 has a small central opening 36 therein and the end wall 32 has a larger central opening 38 therein. A sleeve 40 is keyed to the output shaft 18 and has a flange 42 projecting radially therefrom and bolted to the end wall 30 by a plurality of bolts 44 to mount the windup reel 22 for rotation with the sleeve 40 and output shaft 18.

A stranded electrical flexible cable is wound about the sleeve 40 in a spiral comprising loops 52 positioned substantially in a plane perpendicular to the axis of the shaft 18. The cable extends from the inner end of the spiral through a tube 56 fixed to the motor 16 and extending into the windup reel 22. The tube 56 thus fixes the inner end of the cable. A spiral spring 57 extends along the cable and is fixed to the cable separating the loops 52 of the cable and preventing them from becoming entangled. The end of the cable projecting from the fixed tube provides a fixed end to which electrical connections can be made directly in a simple manner. The cable extends from the spiral loops 52 radially outward through an opening 58 in the cylindrical wall 34 of the reel, and winds about the cylindrical wall 34 with the free end 68 thereof extending downwardly from the windup reel and electrically connected to an electric control box 70.

As illustrated in FIGS. 1–3, the cable is fully unwound to retain the control box 70 in its lowermost position. In FIG. 4 the cable is fully wound to retain the control box in its uppermost position. In the particular embodiment illustrated, the cable extends over three-quarters of the periphery of the outer cylindrical wall 34 when the control box 70 is in its lowermost position, as illustrated in FIG. 3. To raise the control box, the windup reel 22 is rotated through one and one-half revolutions, at which time it is automatically stopped by the running nut assembly 24 and limit switches, as will be described. As the windup reel rotates in a clockwise direction, as viewed in FIG. 3, through one and one-half revolutions to the position illustrated in FIG. 4, the spiral loops 52 merely loosen as illustrated in FIG. 4. The portion of the cable extending through the opening 58 in the outer cylindrical wall 34 is preferably fixed by a clamp 72. Conversely, when the windup reel is rotated in a counter-clockwise direction to lower the control box, the loops 52 tighten and the windup reel is automatically stopped when it again reaches the position illustrated in FIG. 3. The spiral spring 57 maintains the loops 52 separated during this operation.

The running nut assembly 24 comprises a threaded shaft 74 coupled to the output shaft 20 by a coupling sleeve 76. A rectangular running nut 78 is threadably mounted on the threaded shaft 74 and is held against rotation by pair of slide blocks 80 and 82 bolted to the sides of a frame 84 which, in turn, is mounted on the base 12, the slide blocks 80 and 82 slidably riding in slots 86 and 88, respectively, in the sides of the running nut 78.

In the position illustrated in FIG. 1, the left end face of the running nut 78 engages the actuating arm 90 of the limit switch 26 to trip this limit switch to provide a means for stopping the rotation of the windup reel 22 in its lowermost position. An adjusting screw 92 with a lock nut 94 projects from the right end face of the running nut in position to engage the actuating arm 96 of the limit switch 28 to provide a signal for stopping the rotation of the windup reel 22 after it has rotated through one and one-half turns to raise the control box 70 to its uppermost position. By adjusting the projection of the adjusting screw 92, the upper stop position can be controlled and by adjusting the starting position of the running nut 78 relative to the threaded sleeve, the lower stop position can be controlled. The limit switches 26 and 28 can be connected to a suitable control circuit (not shown) including the starting switch mentioned previously in connection with the diagnostic center for analyzing automobile engines so that the electric motor 16 will be energized to cause the windup reel 22 to lower the control box when the starting switch is actuated by the positioning of the automobile. The limit switch 26 will then automatically stop the rotation of the windup reel when the control box 70 is lowered to its lowermost position. After the engine analysis has been completed and the automobile driven away, the starting switch will be tripped again to energize the electric motor 16 to rotate the windup reel to raise the control box 70 and the rotation of the windup reel is automatically stopped when the limit switch 28 is tripped.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims. For example, although the particular embodiment illustrated relates to a stranded electrical cable, it is clear that the invention can also be advantageously utilized with other types of flexible conduits in which a fixed non-rotating end is advantageous, such as air hoses and hoses for grease guns which are used in gas stations and repairs shops. With the construction of the present invention, these hoses can be conveniently wound in a retracted position when not in use and can be unwound when they are to be used, one end remaining stationary to facilitate connection to the hoses.

What is claimed is:

1. In combination, a windup reel having an outer cylindrical wall, drive means for rotating said windup reel in either of two directions, control means for automatically stopping said windup reel in each direction of rotation, a flexible conduit wound in a plurality of inner loops within said reel and extending through an opening in the outer cylindrical wall and wound in outer loops about the outer cylindrical wall with the free end thereof extending downwardly from the windup reel, means for fixing the other end of said conduit against movement to facilitate connection thereto, said inner and outer loops being arranged so that the inner loops loosen and tighten in response to the rotation of the outer cylindrical wall to raise and lower said free end of the conduit.

2. The invention as defined in claim 1 wherein said conduit is an electrical cable whereby the necessary electrical connections can be made to the fixed end of the cable in a very simple manner.

3. The invention as defined in claim 1 including means to maintain said loops separated comprising a spring running along said cable in said loops and fixed to said cable in said loops.

4. A windup reel comprising a rotatable cylindrical outer wall, and a flexible conduit wound in a plurality of inner loops within the outer cylindrical wall with one end fixed against movement to facilitate connection thereto, the other end of said conduit extending through an opening in the outer cylindrical wall and being wound in outer loops about the outer cylindrical wall, the inner and outer loops being arranged so that the inner loops loosen and tighten without completely unwinding in response to the rotation of the outer cylindrical wall to raise and lower said other end of the conduit, and means for maintaining said loops separated.

5. A windup reel comprising a rotatable cylindrical outer wall, a flexible conduit wound in a spiral substantially in a plane perpendicular to the axis of said cylindrical wall within said cylindrical wall with one end of said conduit fixed against movement to facilitate connection thereto, the other end of said conduit extending through an opening in said cylindrical wall and being wound about said cylindrical wall, said conduit being arranged so that the loops of said spiral loosen and tighten without completely unwinding in response to rotation of said cylindrical wall to wind and unwind said cable on said cylindrical wall.

6. A windup reel as recited in claim 5 wherein means are provided for maintaining the loops of said spiral separated.

7. A windup reel as recited in claim 6 wherein said means for maintaining the loops of said spiral separated is a spring running along said cable and fixed to said cable in said loops.

8. The invention as defined in claim 1 including clamping means for clamping to said reel a portion of said conduit between said inner and outer loops.

References Cited by the Examiner

UNITED STATES PATENTS

| | | | |
|---|---|---|---|
| 915,288 | 3/1909 | Hagstrom | 242—107.11 |
| 2,951,920 | 9/1960 | Miller | 200—47 |
| 3,106,368 | 10/1963 | Tait et al. | 242—107.11 |

MERVIN STEIN, *Primary Examiner.*